Figure 1:
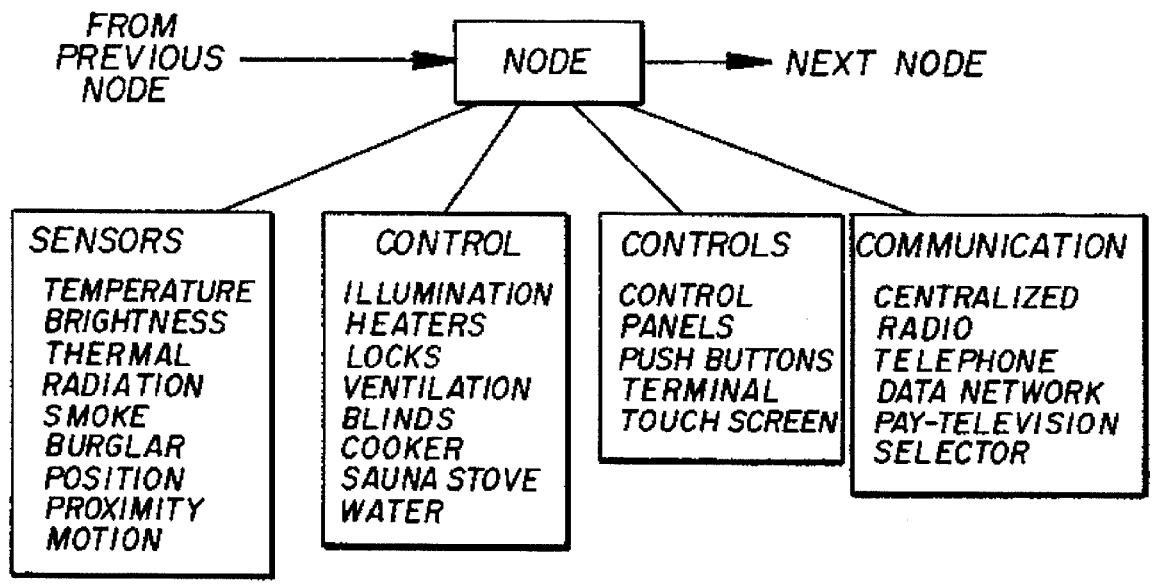

United States Patent [19]

Marttinen

[11] Patent Number: 5,544,153
[45] Date of Patent: Aug. 6, 1996

[54] METHOD FOR TRANSMISSION OF DIGITAL INFORMATION

[76] Inventor: Tapio Marttinen, Alakalliontie 2 D 10, 02760 Espoo, Finland

[21] Appl. No.: 374,503

[22] PCT Filed: Apr. 14, 1993

[86] PCT No.: PCT/FI93/00158

§ 371 Date: Jan. 17, 1995

§ 102(e) Date: Jan. 17, 1995

[87] PCT Pub. No.: WO93/21714

PCT Pub. Date: Oct. 28, 1993

[30] Foreign Application Priority Data

Apr. 16, 1992 [FI] Finland .................................. 921750

[51] Int. Cl.$^6$ .................................................. H04L 12/42
[52] U.S. Cl. ........................ 370/16.1; 370/60; 370/85.5; 370/85.12; 370/85.15; 370/85.14; 370/105.4; 375/365; 371/20.1
[58] Field of Search ............................. 370/16.1, 60, 79, 370/85.5, 85.12, 85.15, 85.14, 94.1, 105.4, 105.5, 106; 375/365, 366; 371/8.2, 11.2

[56] References Cited

U.S. PATENT DOCUMENTS

| | | | |
|---|---|---|---|
| 3,845,472 | 10/1974 | Buchanan et al. | 340/163 |
| 4,709,365 | 11/1987 | Beale et al. | 371/11 |
| 4,847,877 | 7/1989 | Besseyre | 375/365 X |
| 5,003,533 | 3/1991 | Watanabe | 370/85.5 |
| 5,392,281 | 2/1995 | Baumert et al. | 370/60.1 |
| 5,425,022 | 6/1995 | Clark et al. | 370/58.3 |

FOREIGN PATENT DOCUMENTS

| | | | |
|---|---|---|---|
| 0100593A3 | 2/1984 | European Pat. Off. | H04L 11/16 |
| 0115658A1 | 8/1984 | European Pat. Off. | H04L 11/20 |
| 0228629A2 | 7/1987 | European Pat. Off. | H04J 3/16 |
| 0304569A2 | 3/1989 | European Pat. Off. | H04M 11/00 |
| 3328834A1 | 2/1985 | Germany | H04L 25/02 |
| 3728479A1 | 3/1989 | Germany | H04Q 9/00 |
| 2207326 | 1/1989 | United Kingdom | H04L 12/42 |
| WO88/08653 | 11/1988 | WIPO | H04L 11/16 |
| WO91/14324 | 9/1991 | WIPO | H04L 12/28 |
| WO91/15908 | 10/1991 | WIPO | H04L 12/42 |

Primary Examiner—Douglas W. Olms
Assistant Examiner—Russell W. Blum
Attorney, Agent, or Firm—Ronald J. Kubovcik

[57] ABSTRACT

A procedure for the transmission of digital data in a control/monitoring system of a building in which a number of room-specific nodes, one of which operates as a central node, are interconnected by cables and used as control units, which form a loop. Data flows in the system in the form of packets including the fields required for data transmission in the system, as well as fields for commands and corresponding data transfer required by the system. The fields for commands having leading and trailing flags indicating the status of such fields. When a receiver releases a field for commands for a following user, this is done by means of a status bit acting as a trailing flag and being the last in the time scale. This status bit is then transferred by the central node so that it becomes a status bit preceding the released field and acting as a leading flag. This method of handling the status information provided by the flags reduces the need for data buffering at the nodes.

12 Claims, 6 Drawing Sheets

METHOD FOR TRANSMISSION OF DIGITAL INFORMATION

The present invention relates to a procedure for the transmission of digital data in a control/monitoring system of a building.

The increasing number of functions of and devices used in buildings and the increasing safety and environmental requirements impose new requirements on the development of systems for internal transfer of data and energy within a building. In a commercial building, dozens of different systems are needed, and their number is increasing in homes as well. To solve the problem of the expenses resulting from the installation and renovation of these systems, general systems designed to replace separate ones have been developed. In this type of "intelligent" system, it is possible to connect, e.g., temperature sensors and electromechanical actuators to the same conductor.

In these systems, however, several types of medium are used according to the type of mechanical connection of the devices or other requirements. There are also a number of data links completely outside these systems, including, e.g., public address and centralized radio systems, data networks and telephone networks.

In the present invention, all data transmission required in a building is integrated in a single medium. Excluded from the system is only the television aerial signal, but this, too, can be included when the component speeds increase in the future. However, video signals can be transmitted in compressed form even through a slow communication link, such as the 11 MHz link presented as an example in this application. In the system in question, the central component is a room-specific node, a local electronic control center with a sufficient number of connections for the control, monitoring and data transmission functions required for one room.

All devices needed in a room can be connected to the system: illuminators, electric heaters or electrically operated circulation water valves, different motors, locks, etc. The detectors used to obtain the information required for control and alarms include temperature, brightness, proximity, smoke and burglar alarm sensors. Devices using or producing information coded into different forms include computers, loud-speakers, telephones, and in hotels, e.g., the pay-television program selector. All these devices can be connected to a single node simultaneously if necessary.

In the following, the invention is described in detail by the aid of an example by referring to the attached drawings, in which FIG. 1 presents the functions controlled by a node at the room level.

Figure 2:
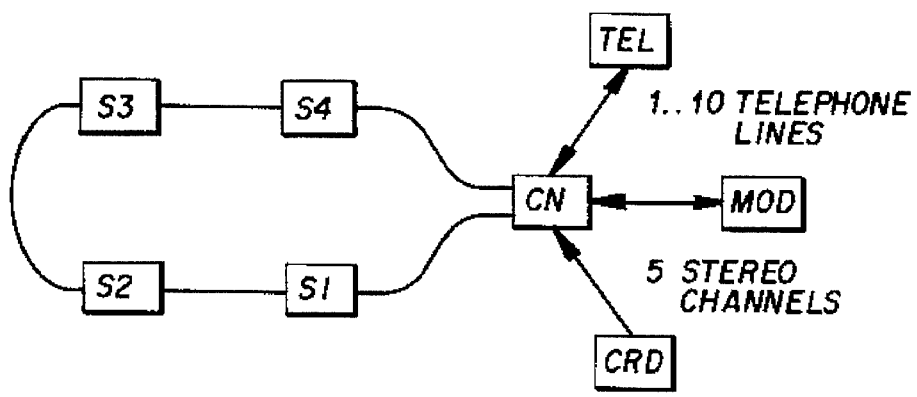

FIG. 2 presents a small system according to the invention, in which CN is the central node, CRD is a centralized radio device, Mod is a telephone modem, Tel is a telephone exchange or a telephone line, and N1 . . . N4 are nodes.

Figure 3:
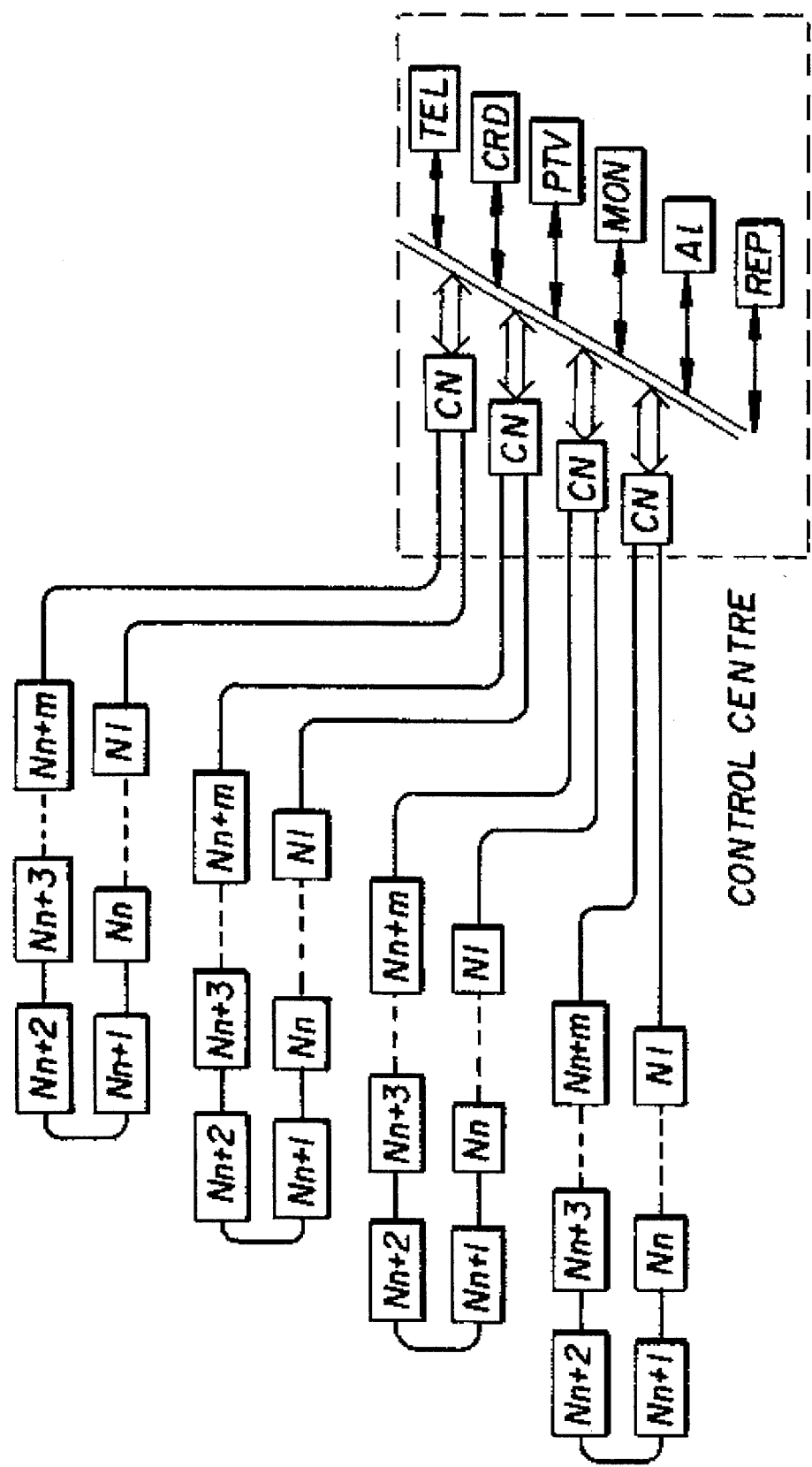

FIG. 3 presents a large system according to the invention, in which CN is the central node, CRD is a centralized radio device, Mod is a telephone modem, Tel is a telephone exchange or a telephone line, and N1 . . . N4 are nodes, PTV is a pay-television center, Mon is monitoring and control, Al is alarms and Rep is reporting.

Figure 4:
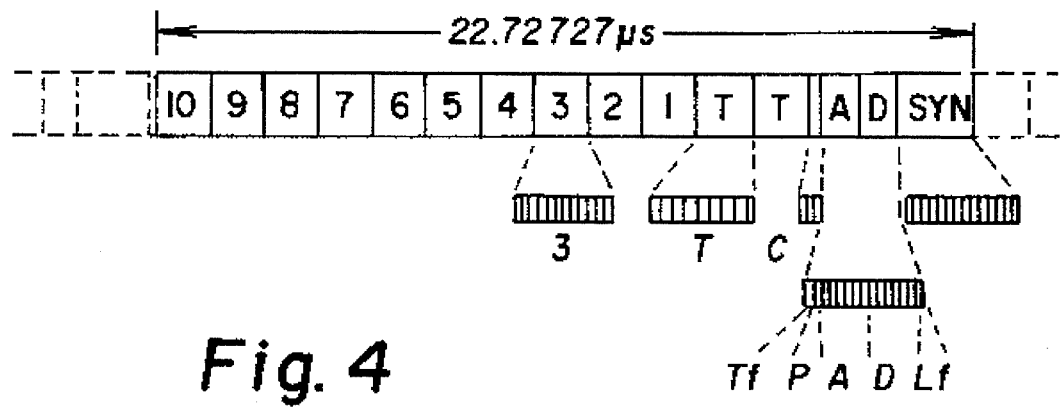

FIG. 4 presents a data packet in which SYN is synchronization pattern, Lf is leading flag, A is address field, D is data field, P is parity, Tf is trailing flag, C is telephone channel counter, T is telephone channel field and 3 is hifi sound.

Figure 5:
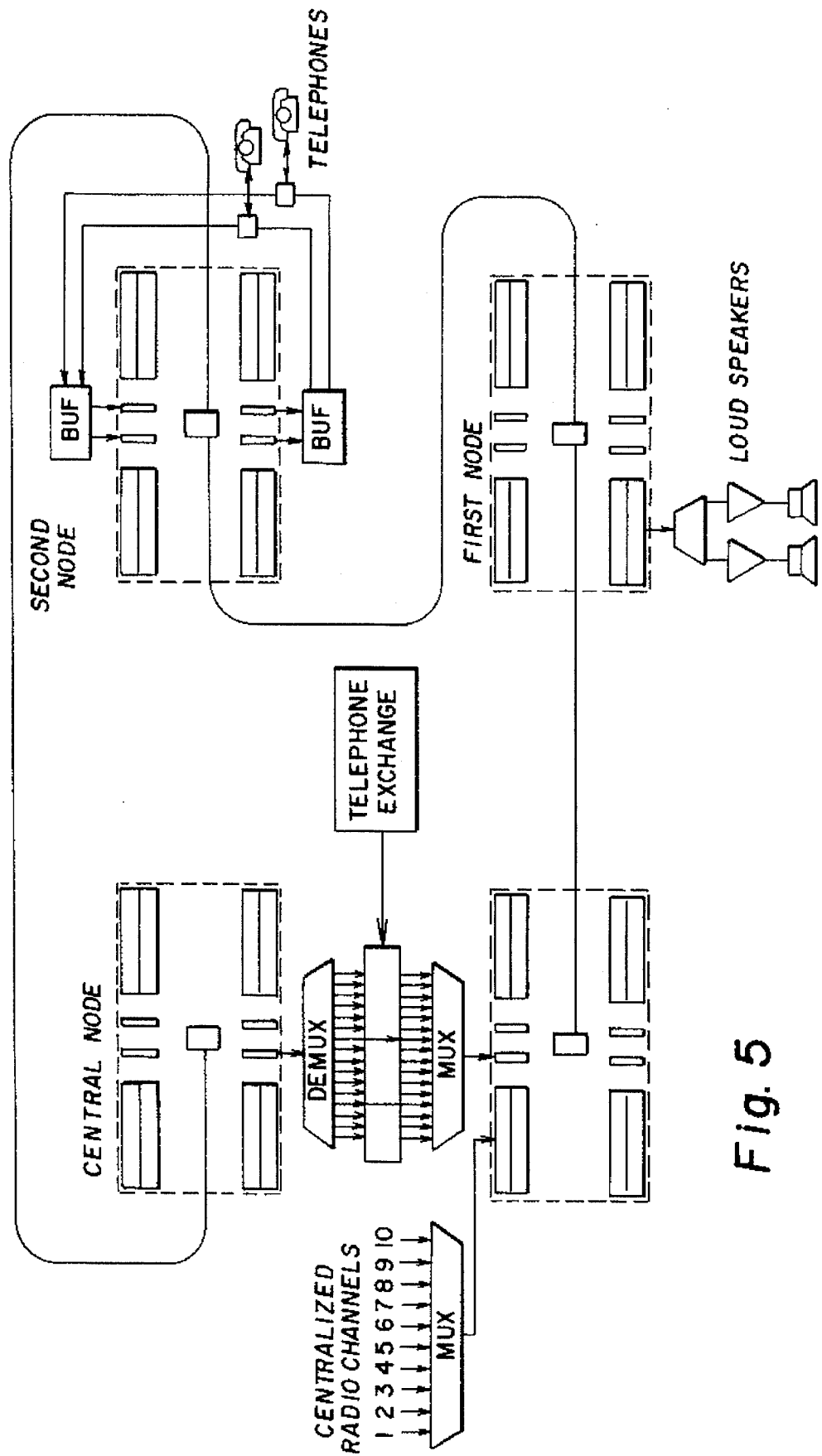

FIG. 5 presents a system of the invention comprising a central node and two other nodes. Connected to the central node are a telephone exchange and a centralized radio program source, to the first node a pair of loudspeakers for stereo sound, and to the second node two telephones.

Figure 6:
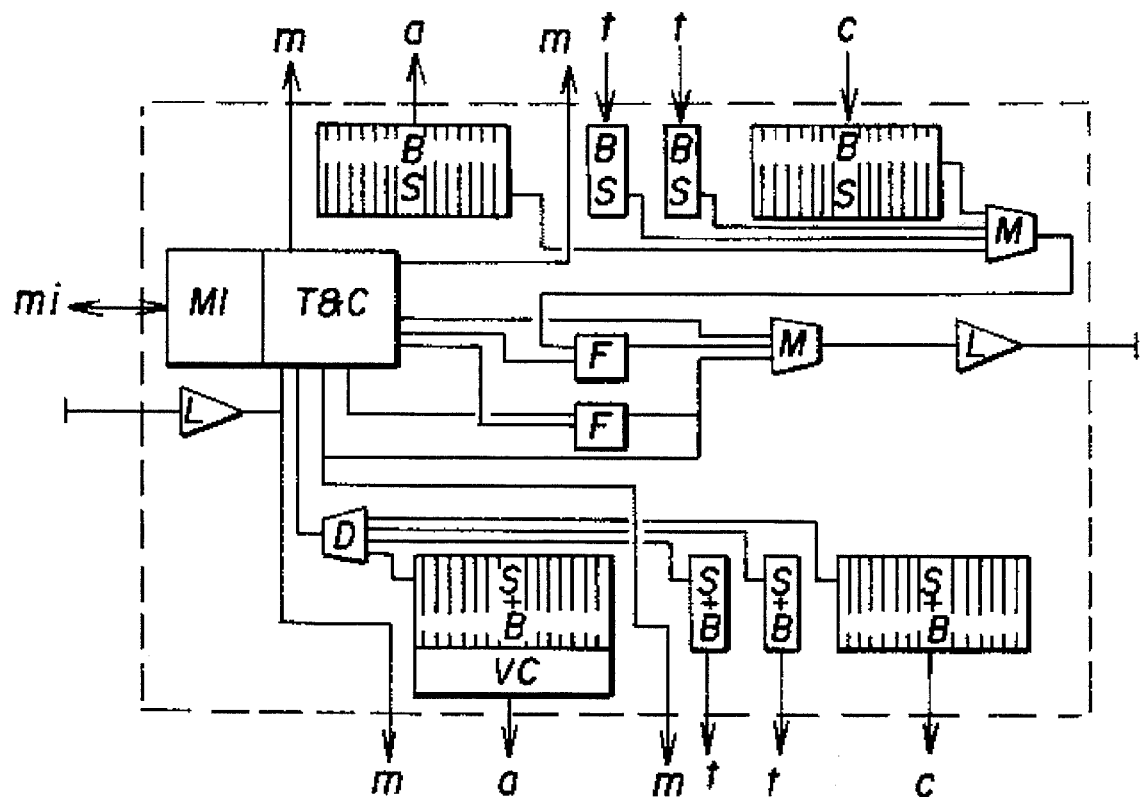

FIG. 6 presents the data transmission electronics, in which T&C is timing and control, MI is microprocessor interface, F is flip-flop, M is multiplexer, L is line amplifier, B is buffer, S is shift register, D is demultiplexer, VC is volume control, m is multiplexer control, a is audio signal, t is telephone signal, c is command, mi is microprocessor interface, and l is loop.

Figure 7:
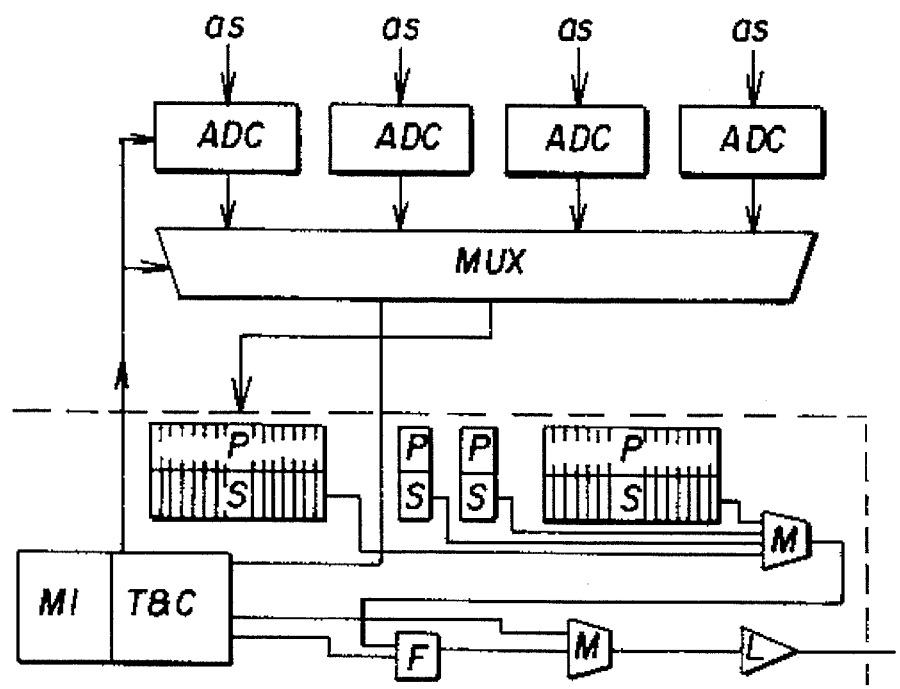

FIG. 7 presents a block diagram representing the transmission of signals, where as is analog signal, ADC is A/D converter, and MUX is multiplexer.

FIGS. 8a–8d represent the communication of commands.

The node controls the devices in the room independently according to the sensor data and the instructions given. For the control, information may be needed from other nodes connected to the system or from outside. The operation of a centralized radio system, telephone, data network and video camera monitoring generally requires communication with the corresponding central device. To implement the data transmission, 2–125 nodes can be connected together by means of galvanic paired or coaxial cable or optic fibre (FIG. 1) to form a data network. The nodes in the network form a loop. The procedure of the present invention provides extremely varied and flexible possibilities for data transmission between the nodes. Each node can function both as a transmitting and as a receiving unit. One of the nodes is the central node. In large systems, the central node of each loop is placed in the control center of the next level. In this way, a star network (FIG. 3) is formed, in which the control center is the center and the loops form the points of the star. Small systems have only one loop (FIG. 2). The central node is provided with connections, e.g., for a centralized radio program source and for a telephone subexchange. One of the functions of the central node is retransmission of the necessary channels (e.g., telephone channels) into the network, because the data in the loop flows in one direction. For instance, the data of the last node in the loop ends up in the central node, from where it has to be rewritten into the loop to allow it to be read by another node.

In the system of the example, the internode communication comprises:

1) command links, of which there may be several in operation simultaneously between any two nodes.

2) telephone connections, 16 lines. The number of lines can be increased in groups of 8 lines. Each group supersedes a mono centralized radio channel.

3) centralized radio hifi sound, 10 channels, unless the number is reduced by other connections, such as telephone connections.

4) compressed video channels. The bandwidth depends on the number of audio channels connected to one video channel. The bandwidth of an audio channel is 704 kHz.

5) computer data network. Uses the same channels as audio connections. Max. ten connections.

Functionally, the above-mentioned transmission connections correspond to corresponding numbers of galvanic cable connections which can be connected via software between two or more nodes. For instance, to establish a telephone connection, a free telephone line is selected and taken into use between two nodes. One of these is generally the central node of a loop. In centralized radio, a desired channel is selected, or two channels if stereo sound is desired. Several nodes can listen to the same channel. A centralized radio connection typically uses one-way communication, whereas a telephone connection uses two-way communication. In other words, the connections replace a bundle of cable connections. Besides, the number of cables replaced is considerably larger than the number of the logical connections mentioned, because in practice, e.g., each telephone requires its own separate line from the exchange to the telephone set.

The electronics containing all the required properties can be placed almost completely in a single integrated circuit. Thus, a very simple physical implementation is achieved for a universal data transmission procedure which can also be easily managed by designers and installers.

Technical Implementation

In practice, a transmission link should have a speed of at least 10 MHz to have sufficient communication capacity. In the present invention, a speed of 11 MHz, which is a multiple of the sampling frequency 44 kHz, has been selected. For the purposes of the invention, it is immaterial whether the link is a galvanic or a fibre-optic one. The selection depends on factors that, in principle, are of secondary importance, such as price and the requirements imposed by the circumstances.

Data flow in the loop is unidirectional. If a specially high reliability is required and the system is expected to remain capable of continuing transmission even if the connection between any of the nodes should break, a duplicate system can be built by adding a stand-by loop in which data flows in the opposite direction.

The essential parts of the electronics required for the data transmission are implemented as an integrated circuit (FIG. 6). The electronics needed around the IC depend on the function of the node. The central node has two circuits, one for sending the packet and the other for receiving it from the loop.

Operation

The central node starts the communication by sending a packet consisting of a synchronization pattern followed by other fields, some which are filled in by the central node. The next node transmits the packet further to the next one, but reads the field reserved for its own use and replaces its content with new data if the node is part of a bidirectional link. If the link is unidirectional, the node only either reads the field or replaces its content. The delay occurring in a node is only one and a half bits (0.136 μs). The delay varies somewhat because the clock generators of the nodes are not synchronous with each other. Immediately after the central node has transmitted the last bit of the packet, it starts sending a new one.

Just before the transmission of the new packet, those fields of the last packet returned complete that are to be retransmitted are loaded into the new packet. This completely returned packet has a consecutive number lower by two than that of the one being transmitted.

Since the number of nodes in a loop varies, a packet arrives back to the central node after a delay depending on the number of nodes in the loop. It is essential to the operation of the system that the delay occurring in the loop never exceeds the length of the packet. The central node is always sending the next packet when the previous one returns. A loop may contain as many as a hundred nodes, so it is essential to the operation of the system that the delay should be as low as 0.136 μs, as mentioned before. The incoming packet generally contains fields that should be retransmitted with the outgoing packet. However, there is no time to transfer them into the packet already being sent, so they are transmitted with the next one. Therefore, in addition to the delay occurring in the nodes, a packet passing through the central node is delayed by an amount corresponding to two packets, i.e., 45.5 μs. This is a delay insignificant in itself. However, the treatment of telephone channels requires a special arrangement, which will be discussed later on.

Communication of Commands

The system has a command communication facility by which the central node can transmit to the nodes commands controlling other data communication as well any data required by the system. A command link is always a connection between two nodes, and the central node is no exception in this respect.

Figure 8A:
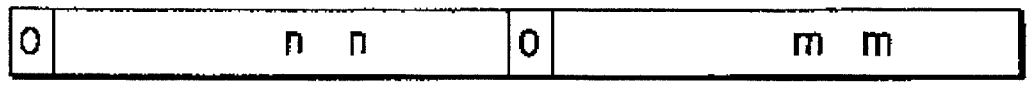

In the communication of commands, the length of the field containing actual data is 16 bits. The interpretation of these bits depends on whether the communication takes place for the making/breaking of a connection or for actual data transmission. To establish a contact with another node, a node first asks the other node whether it is free. Assuming that the node seeking contact is node number mm and the target is node number nn:

1) The caller mm inquires whether nn is free (FIG. 8a)

Bit 15=0 when the word contains data relating to the making/breaking of a connection (handshake data). Bits 14–8 always contain the address of the target of the message. When Bit 15=0 and bit 7=0, bits 6–0 contain the address of the caller.

Figure 8B:

2) The target responds (FIG. 8b)

When bit 15=0 and bit 7=1, bits 6–0 contain a code, in this case the information about whether the target is busy or free. If the target is free, it indicates this with a code and knows that the bytes arriving next come from the same caller.

Figure 8C:
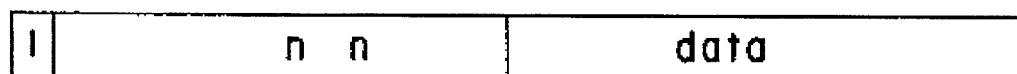

3) The caller mm transmits its message byte by byte (FIG. 8c)

When bit 15=1, bits 7–0 are taken to be the data byte to be transmitted.

4) The caller mm ends the message by sending a handshake word according to item 2.

5) The target acknowledges the end of communication by means of a corresponding handshake word, the code part of which may contain an indication of whether the message was correctly received.

Figure 8D:

A word in the communication of commands is always preceded by a flag (leading flag) indicating whether the field is free. The caller can only write into a free word. When the caller detects a free-flag, it changes it to a reserved-flag and writes a new content into the word. When the target reads its own address from the word, it has to release it for use by others. However, by the time the target realizes that the address coincides with its own, the preceding flag has already been transmitted to the next node and can no loger be written to. However, the word is followed by a trailing flag being the last in the time scale (FIG. 8d) into which the node can write to indicate that the word is released. When the word is again loaded for retransmission into the loop by the central node, the leading flag is updated according to the trailing flag and the latter is reset. Thus, a word always remains reserved at least during its passage from the caller to the central node (FIG. 8d).

The bits in the word are transmitted from left to right. Tf is trailing flag, P is parity bit and Lf is leading flag.

The principle of command communication allows a completely asynchronous connection between nodes. This reduces the need for data buffers at the nodes and thus lowers the cost of their electronics.

In command communication, 36 simultaneous connections can be maintained if the transmission speed of each connection is 9600 baud.

Telephone Traffic

In telephone traffic, the sampling frequency is 8 kHz instead of the 44 kHz frequency for other channels. Conversion accuracy is 8 bits. Complete transmission of one telephone channel takes place during four packets. In a packet there are two bits reserved for one telephone channel. A complete transmission cycle consists of 11 packets and is as follows: Packet 1 contains telephone channel bits 0 and 1, packet 2 bits 2 and 3, packet 3 bits 4 and 5, packet 4 bits 6 and 7, packet 5 is empty, packet 6 contains bits 0 and 1, packet 7 bits 2 and 3, packet 8 bits 4 and 5, packet 9 bits 6 and 7, packet 10 and 11 are empty. In other words, two 8-bit samples are transmitted at a frequency of 4 kHz, which means a sampling frequency of 8 kHz. If the ISDN command channels are in use, they can be placed on the empty bits.

The packet has a field common to all telephone channels, indicating the number (phase) of the packet being sent from the central node. For example, if the central node is sending packet number three, then at the beginning of the transmission it will receive the latter part of packet number two and at the end the first part of packet number three. The telephone fields of packet number two that are to be retransmitted into the loop can only be transferred into packet number four, before the transmission of which all of packet number two has arrived to the central node. In other words, a node has to take care that, when it reads the two bits from the telephone channel reserved for it, e.g., if for packet number two those bits are bits 2 and 3, then it has to write in their place bits 6 and 7, which belong to packet number 4.

Other Signals

A packet contains 10 fields that can be used for the transmission of a hifi-level audio signal, a compressed video signal or of data. Several channels can be reserved for a single video signal according to the picture quality required. The channels are separated by a 0-bit to prevent the occurrence of more than 16 successive 1-bits and the confusion of the bit sequence with the synchronization pattern. The 0-bit can also be used as a parity bit if care is taken that the word does not contain more than 8 successive 1-bits.

Characteristics

1) Command connections:
   Connection between any two nodes
   Unlimited number of simultaneous connections
   Transmission speed 44000 (8-bit) bytes per second
   Correctness of transmission checked by software
2) Telephone connections:
   16 lines, expandable in groups of 8 lines, each additional group taking up the space of one hifi audio channel
   transmission speed: 8000 (8-bit) bytes per second
   ISDN command connection 16 kb/s
3) Centralized radio hifi sound:
   Max. 10 channels
   Can be connected as five stereo channels
   Transmission speed: 44000 words (16 bits)
4) Computer data transmission and monitoring video camera image transmission:
   Uses the same channels as hifi sound
   The same transmission speed as for hifi sound
   In all connections, any node can function both as transmitter and as receiver.

What is claimed is:

1. Procedure for the transmission of digital data in a control/monitoring system of a building, said system comprising a number of room-specific nodes interconnected by means of fibre-optic or galvanic cables and used as control units, which form a loop, and of which one node operates as a central node, in which system the data flows in the form of packets including the fields required for data transmission in the system, the fields further comprising fields for commands and corresponding data transfer required by the system, of which fields the fields for commands have leading and trailing flags expressing a status of the fields for commands, wherein in a field for commands a receiver releases the field for a following user by means of a status bit acting as a trailing flag and being the last in the time scale, which status bit is transmitted in the time scale by the central node to become a status bit preceding the released field and acting as a leading flag, which informs the following user about the status of the field, such that a transmission delay caused by the number of nodes is even at its maximum less than the time needed for the transmission of one packet when the number of nodes is at the most half of the number of bits in the packet and when the delay of one node is always less than the transmission time of two bits.

2. Procedure for the transmission of data according to claim 1, characterized in that each node is able both to receive data by reading a field in the packet and to transmit data by replacing the data in a field of the packet with new data.

3. Procedure according to claim 1 for the transmission of data in a system at least partially implemented in the form of a loop, characterized in that the data either flows in one direction in the loop or, in systems requiring special reliability, a duplicate loop is used, the data in the other loop flowing in the opposite direction.

4. Procedure for the transmission of data according to claim 1 or 3, characterized in that the packets are transmitted in the loop at a constant frequency.

5. Procedure for the transmission of data according to claim 1, characterized in that the delay occurring in the passage of a packet through all the nodes of the loop and back to the central node is, even at its maximum, less than the time elapsing during the transfer of one packet, said delay being dependent on the number of nodes, and that the ordinal number of a packet completely returned to the central node is always lower by two than that of the packet being transmitted, so that telephone signals to be transmitted at a frequency lower than the packet frequency can be as-sembled on the basis of the current number of the packet transmission cycle relating to the transmission of telephone signals.

6. Procedure for the transmission of data according to claim 1, characterized in that the loop has a central node which controls the timing of the transmission of the packet, fills in the required fields from different sources and copies the necessary fields from the packet received from the loop for retransmission into the loop, and that several loops can be connected by means of said central node to form a larger system.

7. Procedure for the transmission of data according to claim 1, characterized in that a command field contained in the packet conveys commands controlling other data communication from the central node to the nodes as well as all data trans-misson required by the control/monitoring system.

8. Procedure for the transmission of data according to claim 7, characterized in that the command field is preceded by a flag indicating whether said field is free or reserved, passing this information to a node writing to said field, and that the command field is followed by another flag, by means of which a node having just read the field can release the field.

9. Procedure for the transmission of data according to claim 1, characterized in that, if any one of the nodes does not receive a packet from the loop, the node will start sending packets independently into the loop, enabling a break in the loop to be automatically located.

10. Procedure for the transmission of data according to claim 1, characterized in that the packet contains a synchroniza-tion field, by means of which the fields of the packet can be located, and that the occurrence of data matching the synchronization field data is prevented in other parts of the packet.

11. Procedure for the transmission of data according to claim 3, wherein the packets are transmitted in the loop at a constant frequency.

12. Procedure according to claim 1 for the transmission of data in a system at least partially implemented in the form of a loop, wherein a duplicate loop is used and the data in the duplicate loop flows in a direction opposite to the direction of data flow in a first loop.

* * * * *